United States Patent Office 3,493,561
Patented Feb. 3, 1970

3,493,561
CHEMICALLY OXIDIZED STARCH DISPERSANT
Jack H. Kolaian, Wappingers Falls, N.Y., and Jack H. Park, Houston, Tex., assignors to Texaco Inc., New York, N.Y., a corporation of Delaware
No Drawing. Continuation-in-part of application Ser. No. 649,398, May 12, 1967. This application June 28, 1968, Ser. No. 741,214
Int. Cl. C08b *19/04;* C10m *3/14;* E21c *41/10*
U.S. Cl. 260—233.3       20 Claims

ABSTRACT OF THE DISCLOSURE

The invention is directed to a method of producing a chemically oxidized starch dispersant for use in an aqueous drilling fluid to disperse clay solids therein and to improve the high temperature stability of the drilling fluid and to the oxidized starch dispersant per se. The method comprises reacting a starch material with a water soluble oxidizing agent which is present in an amount of about 0.04 to about 0.5 gram atom of available oxygen per 100 grams of starch reactant in an aqueous acidic reaction medium wherein the acid reactant is present in an amount of from about 4.5 to about 220% by weight per part by weight of starch at a temperature between about 75° and 150° F. and below the gel temperature of the starch in the reaction medium for a period of time between about 2 minutes and about 75 minutes and sufficient to form an oxidized starch dispersant and drying the resulting oxidized starch product.

---

This application is a continuation-in-part of application Ser. No. 649,398, filed May 12, 1967, now abandoned, which is a divisional application of application Ser. No. 510,085, filed Nov. 26, 1965, now abandoned, which is a continuation-in-part of application Ser. No. 296,917, filed July 23, 1963, now abandoned.

This invention relates to a novel aqueous drilling fluid for drilling wells through sub-surface formations by means of well drilling tools, and particularly to such an aqueous well drilling fluid having both improved dispersibility and improved high temperature stability as a result of including a novel modified starch dispersant material as an essential ingredient thereof. The invention is also concerned with a method of drilling wells employing the novel aqueous drilling fluid, a novel process for producing the novel modified starch dispersant and the novel modified starch dispersant per se as a composition of matter.

Drilling fluids, or muds as they are sometimes called, are slurries of clayey solids used in the drilling of wells for tapping underground collections of oil, gas, brine, or water. Such fluids have a number of different functions, the most important of which are to assist in the removal of cuttings from the well, to seal off formations of gas, oil, or water which may be encountered at different levels, to lubricate the drilling tool and drill pipe which carries the tool, and to hold the cuttings in suspension in event of shut-downs in drilling.

An ideal drilling fluid is a thixotropic colloidal system, i.e., a fluid which on agitation or circulation (as by pumping or otherwise), has a measurable relatively low viscosity and is free flowing (not plastic), particularly at high temperatures; but when such agitation or circulation is halted, the fluid sets or gels. On a high temperature basis a shear below 500 pounds per 100 square feet is advantageous. The rate of gel formation is such as to permit the cuttings to fall only a short distance before the gel structure is sufficiently strong to support them.

When such a drilling fluid having the proper viscosity, the proper gel rate and proper gel strength is circulated through a well bore, it has a sufficiently high viscosity to carry the cuttings and sand from the bottom of the hole to the surface and it has a gel rate such as to allow the cuttings and sand to settle in a settling pit. On standing in a quiescent state, it develops sufficient gel strength to prevent the settling of the cuttings, sand or weighting material, etc., in the well bore when it becomes necessary to discontinue circulation for any appreciable period of time. Such a fluid is also characterized by its ability to form a mud cake on the bore hole wall, thereby assisting in sealing off the traversed formations and inhibiting so-called water loss, i.e., loss of water from the drilling fluid.

One of the principal problems in mud chemistry is the production of suitable drilling fluids having satisfactory dispersibility, and the necessary thixotropic properties discussed above. This problem is of particular importance when drilling extremely deep wells, which may range from 12,000 to 20,000 feet or more in depth in modern drilling technology. At such depths the temperature rises to a high value and may at times be as high as 250 to 500° F. Under such high temperature conditions ordinary muds tend to lose their stability and to thicken in the hole, and generally exhibit a shear value in excess of 500 pounds per 100 square feet thus hampering the drilling operation seriously.

In accordance with the present invention, the problems of dispersibility and high temperature stability can be solved by incorporating in an aqueous drilling fluid an oxidized starch material, as hereinafter more particularly described, in an amount of from about 0.5 up to about 15 pounds per barrel of fluid.

The novel oxidized starch material dispersant of the present invention is characterized by a hydroxyl absorbance at 2.95 microns of from about 0.500 to 1.0, a carbonyl absorbance at 5.8 microns between 0 and .143 and a carbonyl absorbance at 6.0 to 6.3 microns of .084 to .161, as determined by infrared analysis.

In contrast, an unmodified corn starch (Argo brand food grade) has a hydroxyl absorbance at 2.95 microns of 0.335, a carbonyl absorbance at 5.8 microns of 0.046, and a carbonyl absorbance at 6.07 microns of .091. Furthermore, the novel oxidized starch dispersant materials of the present invention are characterized by a relatively low water solubility, being less than about 15 percent by weight in boiling water, as compared to the complete solubility of a commercial yellow dextrin sold under the trade name Nadex 791, a hypochlorite oxidized corn starch. However, the novel oxidized starch dispersants are soluble in aqueous alkaline solutions.

It is known from U.S. 2,604,447 that heat treated starches can be used in aqueous drilling fluids as water loss agents. It is also known from U.S. 2,417,307 that aqueous drilling fluids containing thin boiling gelatinized starches exhibit relatively low water loss properties. Such a starch, which is gelatinizable in cold water, is prepared by treating the starch, during or before gelatinization, with an oxidizing agent or acid. U.S. 2,951,776 discloses that a decolorized, pregelatinized starch can be used to impart desirable water loss properties to a drilling fluid. The decolorized, pregelatinized starch can be prepared by reacting at a pH of 4–5, a partially refined pigmented starch slurry with an ammonium, alkali metal- or alkaline earth metal-chlorite.

The novel oxidized starch dispersants of the present invention are distinct from these prior art starch materials in aqueous drilling fluids for the novel oxidized starch dispersants are dispersing agents rather than water loss agents. The novel oxidized starch dispersants of the present invention serve to thin out and disperse the clay solids in the drilling fluid whereas these prior art type starch materials tend to thicken the mud to improve its caking ability while exhibiting little or no dispersing properties thereon. In addition, the prior art starches do not impart desirable high temperature stability to aqueous drilling fluids, particularly at temperatures above about 350° F., whereas the novel oxidized starch dispersants of this invention exhibit this particularly desirable effect.

Apparently this difference is attributable to the infrared absorbance values in the 2.95, 5.8 and 6.0 to 6.3 micron region of the novel dispersants and to their method of preparation involving oxidation in an acidic medium which results in products having a relatively low pH, that is below about 2.5, as determined on a 10 gram sample in 50 ml. of distilled water, with stirring.

The novel oxidized starch dispersants of the present invention exhibit relatively poor water loss properties comparable to the poor water loss properties of conventional drilling fluid dispersants such as materials sold under the trade names Kembreak, Rayflo, Q-Broxin and the like. In general all of the above dispersants, including the oxidized starch dispersant, exhibit a water loss of at least about 14 ml. in a low lime and at a concentration of 3.5 pounds per barrel, measured by the standard API Water Loss Test for 30 minutes. In a shale control mud of the type disclosed in U.S. 2,802,783 at this concentration the API 30 minute water loss of all of the above dispersants is at least about 20 ml.

As used in the specification and appended claims the terms "starch" and "starch material" includes the corn, arrowroot, tapioca, sago and potato starches; the commercially available pre-oxidized corn starches, both the pearl and food grades sold under various trade names like Stayco, National, Hercules, Nalex, Abinco and the like which are generally prepared by hypochlorite oxidation of corn starch, as well as mixtures of such starches.

Another unexpected feature of this invention is that a modified shale control mud can be formulated for drilling through heaving or sloughing shale formations in a rapid, efficient manner with the novel starch dispersants of the present invention. These modified shale control drilling fluids contain lime and caustic but are free from any added water soluble calcium salt. These modified shale control drilling fluids can attain the same beneficial results as achieved, with the shale control drilling fluids of Weiss and Hall, U.S. 2,802,783, i.e. stabilizing and hardening the shale formations in contact therewith. The shale control drilling fluid of U.S. 2,802,783 requires a water soluble calcium salt to be present to provide a calcium ion concentration of 200 p.p.m. or more in the drilling fluid to attain comparable shale hardening and stabilization. This surprising and wholly unexpected result achieved with the novel starch dispersant of the present invention cannot be achieved with other known drilling fluid dispersants such as calcium lignosulfonate or a ferrochrome lignosulfonate.

The novel oxidized starch dispersant materials of this invention can be prepared in a novel and efficient manner. A suitable quantity of starch material in an aqueous acidic medium is oxidized using a water soluble inorganic oxidizing agent at a temperature not substantially above the gel temperature of the starch reactant for a period sufficient to convert the starch into an oxidized starch dispersing material and then drying the resulting oxidized starch product of reaction.

The oxidizing agent is used in an amount of from about 0.04 to 0.5 gram atom of available oxygen per 100 grams of starch reactant. Most satisfactory results are attained with a range of 0.04 to 0.11 gram atom of the oxidizing agent per 100 grams of starch reactant.

The acid component of the reaction medium is employed in a concentration of from about 4.5% to about 220% by weight, per part by weight of starch with a range of from about 6% to 44% being preferred for most satisfactory results.

Acids which can be used in the preparation of the oxidized starch material include the mineral inorganic acids, such as nitric acids, hydrochloric acid and sulfuric acid, and organic acids such as acetic acid, propionic acid, benzenesulfonic acid and toluenesulfonic acid. Nitric acid is the preferred inorganic acid because of the smoothness of the oxidation reaction using this acid and the relative freedom of the oxidized starch product from undesirable occluded residues therefrom.

The effective inorganic oxidizing agents are broadly described as the water soluble inorganic oxidizing acids and salts thereof. These oxidizing agents include the water- and acid-soluble permanganates, chromates, dichromates, chlorates, chlorites, hypochlorites, bromates, hypobromites, peroxides and peroxodisulfates, particularly the alkali metal and ammonium salts of these compounds, hypochlorous and peroxodisulfuric acids. Preferred oxidizing agents are the alkali metal dichromates and permanganates, since these salts permit one to visually determine the degree of oxidation of the starch material by the color changes of the chromium and manganese ions during the oxidation reaction.

Oxidation reaction times can vary from about 2 to 5 minutes up to about 60 minutes or more and, in some instances, depending upon the reaction temperature, can be up to about 2 hours. Most consistent results are obtained using oxidation reaction times between about 30 and 75 minutes at temperatures between 75° and 150° F. In general, the reaction time is inversely proportional to the reaction temperature, the longer times being used with the lower temperatures.

It is necessary to control the reaction temperature during the initial stages of the reaction to prevent formation of undesirable gels with the acid slurry of the starch material. Accordingly, during the initial phases of the reaction, the reaction temperature should be maintained below the gel temperature of the starch reactant. For example (when food grade corn starch is used as the starting material and the starch is added to the acid reaction medium and slurried therewith, initial heating of the starch-acid mixture should be controlled so as to not exceed a temperature of about 135° F., as the gel temperature of the food grade corn starch in this medium is about 140° F., at atmospheric pressure. If initial heating is done at or above the starch gel temperature, vigorous agitation and/or dilution of the reaction medium with a large quantity of water is necessary to break up or decrease the formed gels.

Subsequent to the addition of the oxidizing agent to the starch-acid slurry, the reaction temperature can be increased to about 150° F. and maintained at this temperature until reaction is complete. Reaction temperatures as low as room temperature can be used but the reaction times in such a case are longer than those at an elevated temperature.

At the completion of the oxidation reaction, the resulting oxidized starch dispersant reaction product is removed from the mixing vessel and dried until its water content is less than about 10% by weight, preferably 5–8%, and from about 3 to 6% by weight, for a neutralized or partially neutralized product. Drying of the starch material can be accomplished in a variety of ways, such as, for example by air drying, oven drying, drum drying, spray drying or combinations thereof. It is preferred to carry out the drying operation rapidly at an elevated temperature in order to remove quickly any occluded water from the oxidized starch reaction product. Satisfactory results have been obtained by pouring the reaction product onto a steel or metallic plate in a relatively thin layer, for example, about ⅛" or less in thickness, the plate being maintained at a temperature of about 350° F. during the drying operation. By carrying out the drying operation in this manner the oxidized starch product can be dried in about 0.5 to about 7 minutes. Thereafter, the dried product can be removed from the drying plate, and, if desired, pulverized to the desired fineness. Satisfactory results can also be obtained by drum or spray drying the reaction product in a conventional manner well known in the art. In the drying operation it is necessary to avoid the reaction product being heated at temperatures substantially above about 250–350° F. for relatively long periods of time because of the likelihood of the oxidized starch product being altered in such a way that it will no longer be a satisfactory dispersant. However, exposure to temperatures above 300° F., for example from 375 to 425 or up to 500° F., for short periods of time, i.e. about 5 minutes or less in drying will not adversely affect the oxidized starch material.

In the drying operation wherein the product has been oxidized with dichromate and for comparable drying times, it has been found that the use of drying temperatures below about 275° F. produced a gray colored product which exhibited excellent dispersing properties in a high pH mud such as a shale control type of drilling fluid, whereas this particular colored product required a brief aging period to obtain good dispersing effects in a low pH mud system. An oxidized starch dispersant dried at a temperature in excess of about 350° F. produced a relatively blue colored material that was immediately effective as a dispersant in low pH mud systems. Oxidized starch products dried at temperatures between about 275° F. and 350° F. were green in color. These materials were satisfactory for use in both the low pH and the high pH mud systems.

The term low pH mud system used hereinabove does not include the so-called gyp mud system. Both the gray colored and the green colored oxidized starch dispersants performed satisfactorily as dispersants in the gyp mud system.

An alternate method of recovering the oxidized starch product from the reaction vessel is to filter, preferably under vacuum, the products of reaction, water wash the crude reaction residue several times, if necessary, and then dry the washed oxidized starch product at temperatures of about 175 to 200° F.

A further modification that produces desirable results comprises partially neutralizing the acidic reaction product slurry with an alkaline material such as sodium or potassium hydroxide to a pH of about 4 to 7, preferably 4–6.5, before the drying step.

The order of addition of the reactants is not critical. For example, the starch material can be added to the acid reaction medium and then the oxidizing agent added to the starch-acid mixture. On the other hand, the acid can be added to the starch and the oxidizing agent added immediaely thereafter, or the starch and oxidizing agent can be first mixed together and then the acid reaction medium blended therewith. A preferred procedure is to mix the starch material with the water, raise the temperature of the resultant mixture to about 110–120° F., add the acid reactant and thereafter add the oxidizing agent thereto. This method avoids possible gel formation during initial stages of mixing.

During the initial phases of the reaction, it is desirable to agitate the reaction components to minimize the tendency of the starch component to form undesirable gels, particularly at temperatures near the gelling point of the starch reactant. Accordingly, the mixing vessel should be provided with a stirrer to keep the reaction components intimately mixed during the mixing and reaction stages. Stirring can be discontinued within a relatively short time after the reactants have been brought into contact with one another, but it is preferred that mixing be continued until reaction is complete.

Increasing the concentrations of the acid reactant and the oxidizing agent reactant tends to reduce the overall reaction time without adversely effecting the quality of the oxidized starch reaction product.

It has been found that using a water soluble dichromate oxidizing agent produces a product having a color varying from blue to green to brown. Use of hydrogen peroxide oxidizing agent yields a whitish colored product while potassium permanganate yields a brown product.

Characterizing tests on the oxidized starch dispersants are described as follows:

INFRARED ANALYSIS

Using standard infrared spectroscopy procedure the OH absorbance at the 2.95 microns absorption band, the carbonyl ($C=O$) absorbance at the 5.80 microns absorption band and the carbonyl absorbance in the 6.0–6.3 microns absorbance bands were determined.

Due to the relative water insolubility of the novel oxidized starch dispersant product, samples were examined in the form of discs which were prepared by mixing one gram of powdered infrared quality potassium bromide and 4 mg. of the oxidized starch sample. 300 mg. of this mixture were placed in a die, evacuated for two minutes, and then pressed into a disc at a pressure of 640 p.s.i.

Many of the experimental determinations described hereinafter were conducted for convenience upon calcium base shale control drilling muds of the type described in detail in U.S. Patent 2,802,783. Such a mud comprises clayey solids suspended in an alkaline aqueous phase which consists essentially of a saturated aqueous calcium hydroxide solution and a water soluble calcium salt which has a solubility in the aqueous phase greater than that of calcium hydroxide dissolved therein, to yield a calcium ion concentration in the aqueous phase of at least 200 p.p.m. by weight, and sufficient to stabilize and control the mud making properties of heaving shale material in contact with the mud. However, the principles of the invention are applicable to other types of muds.

A general discussion of high temperature phenomena follows, with particular reference to the significance of shear or gel strength measurements, and the viscosity of samples.

In general, some degree of high temperature gelation occurs in most clay-water systems when exposed to temperatures above normal. High drilling temperatures affect the drilling fluids used in producing petroleum from underground formations. Under static conditions temperature tend to accelerate the development of gel structure in the mud. The end result of this gel development will depend upon the temperature, time for development, and susceptibility of the mud to gelation. The strength of the gel developed will range from a low, easily measured gel, through plasticity to a rigid cement-like mass which practically defies classification as a gel.

Another observed high temperature effect is on viscosity. As with the gel development, temperature may have little or no effect on the viscosity of the mud or may thicken the mud to a point where it becomes practically unpumpable. The end viscosity of a mud appears to be independent of whether the mud has been continually agitated or remained quiescent during the heating cycle. The effect of temperature on the physical properties of muds may be classified into three characteristic patterns.

NORMAL RESPONSE TO TEMPERATURE

Drilling mud slurries possess a property known as thixotropy. Therefore the clay particles of the slurry tend to orient themselves with time under a static condition to produce a semi-rigid gel structure. Elevated temperatures tend to accelerate the rate of formation and degree of development of this property to such an extent that muds often develop gel structures of appreciable strength.

Muds possessing a normal response to temperature will refluidize to a condition approximating their original viscosity when subjected to mechanical agitation.

ABNORMAL RESPONSE TO TEMPERATURE

In a second response to temperature, which is called high temperature gelation, the muds undergo gelation to yield similar semi-rigid structures; but these gels are not thixotropic. Therefore, the muds will not refluidize satisfactorily but remain as highly viscous to semi-plastic slurries.

The degree of gelation cannot of itself be used to distinguish muds of this type for, although the degree of gelation in muds of this type is usually somewhat higher than in muds possessing normal temperature response, there can be appreciable overlap between the two types. The important criterion is the retention or loss of thixotropic response following high temperature aging.

HIGH TEMPERATURE SOLIDIFICATION

The most severe reaction to temperature is often referred to as high temperature solidification. In this case a more complex rigid structure is formed which in severe cases approaches a cement-like solid consistency. These muds usually have lost any resemblance to a thixotropic fluid and upon agitation may tend to granulate and crumble into a discontinuous mass.

In the preparation of an improved drilling fluid in accordance with the present invention a drilling fluid additive composition can be employed. In accordance with one embodiment for use in drilling through heaving or sloughing shale formations with a modified shale control reagent additive admixture a drilling fluid additive composition comprises an admixture of a water soluble alkalinity agent such as lime or calcium hydroxide and the chemically oxidized starch dispersant. The composition of this admixture is usually in the weight ratio range of from about 0.5 to 4 parts by weight of the alkalinity agent (lime or calcium hydroxide) per part by weight of the starch dispersant and preferably a weight ratio of 1 to 3:1 for the most satisfactory results. This modified shale control additive composition embodiment is particularly suitable in drilling fluids being used in heaving or sloughing shale formations because it avoids the need of using therewith the water soluble hygroscopic salt calcium chloride.

In a further embodiment for a shale control additive composition such as disclosed in U.S. 2,802,783, one may incorporate in the aqueous drilling fluid a water soluble calcium salt such as calcium chloride, calcium sulfate or the like in addition to lime and the chemically oxidized starch dispersant. The weight ratio range of such an admixture may be 2 to 6 parts of lime or calcium hydroxide alkalinity agent, 1 part of water soluble calcium salt, e.g. calcium chloride, and 0.5 to 10 parts of the chemically oxidized starch dispersant. The above weight ratio ranges can be modified dependent on the equivalent or molecular weights of the respective components of the admixture and whether the components are employed in the anhydrous or hydrated form.

If desired, other drilling fluid additives can be incorporated in the additive composition such as starch or carboxymethylcellulose as the water loss additive, etc. These additive admixtures are preferably in solid form but may also be in the form of an aqueous slurry or solution.

Example 1

Argo brand, food grade, corn starch in an amount of 20 grams was slurried with 38 milliliters of an aqueous 0.5 M nitric acid solution and heated to a temperature of 120° F. There was added to the heated slurry 13 milliliters of an aqueous 0.2 M sodium dichromate solution and mixing was continued. The temperature of the resulting mixture was increased to about 140–150° F. and maintained at this temperature for about 30 minutes. The crude reaction product was removed from the reaction vessel by pouring the contents onto a steel plate heated in a forced air drying oven to form thereon a relatively thin layer of about 1/8″ or less in height of the oxidized starch product. The heated steel plate now containing the crude reaction product was then heated additionally for about 5 minutes at an oven temperature of 300–325° F. The plate containing the dried reaction product was removed from the oven, allowed to cool to room temperature and the reaction product removed therefrom. The reaction product was pulverized and there was obtained a light green colored powder. The product yield was about 100 percent on a dry starch basis.

Example 2

A sample of Argo food grade corn starch in an amount of 20 grams was admixed in a laboratory vessel provided with a mechanical stirrer with 75 ml. of an aqueous 1.8 M nitric acid solution and heated to 115° F. for 2 minutes. There was added to the slurry 75 ml. of an aqueous 0.1 M sodium dichromate solution and the resultant mixture was heated with stirring to a temperature of about 135° F. for 5 minutes. The resulting reaction product was filtered on a Buchner funnel. The product was oven-dried at 240° F. for 20 to 30 minutes and, after cooling, pulverized into a light green colored powder.

The resultant product on analysis was found to contain about 40.39% carbon, about 5.99% hydrogen, about 1.20% nitrogen and by difference 52.42% oxygen. In addition, there was a residue of about 2.4%. The oxidized starch reaction product had a pH of about 1.6 and it was soluble in water at 77° F. to the extent of 6.9% by weight. The low pH is due in part to occluded acid from the reaction medium.

A 1% saturated aqueous solution of the product was treated with 0.025 mol. of 0.1 N iodine in potassium iodide solution and the spectrum of the resulting starch-iodide complex was determined with a Coleman Model 11 Spectrophotometer against distilled water. The galvanometer as balanced to obtain directly the percent transmittance of the complex. The method is described in the article by R. W. Kerr and O. R. Trubell, "Paper Trade Journal," Oct. 7, 1943. For convenience the data obtained are summarized below. For purposes of comparison data are also presented for the starch starting material.

PERCENT TRANSMITTANCE OF STARCH

| Wave Length ($\mu$): | Blank* | Food Grade Starch | Product of Example 2 |
|---|---|---|---|
| 390 | | 23 | 5 |
| 400 | 40 | 28 | 6.5 |
| 425 | | 40 | |
| 450 | 55 | 46 | 7 |
| 500 | 71 | 66 | 5.5 |
| 550 | 91.5 | 87 | 6 |
| 600 | 97 | 93 | 11.5 |
| 650 | 99 | | 22 |

*Values for 1% of 0.1 N iodine-potassium iodide solution.

It is to be noted that the oxidized starch dispersant absorbs strongly in the 500–650$\mu$ region (amylose-iodine complex region) as is evidenced by the relatively low transmittance values in the above table. These low transmittance values indicate the presence of amylose like structure in the product.

The oxidized starch product gave a negative reaction when tested with ferric hydroxamate, in accordance with a method described by R. L. Schriner, R. C. Fuson and D. Y. Curtin, "The Systematic Identification of Organic Compounds," fourth edition, 1956, at page 122.

Example 3

A slurry of 5 grams of corn starch and 50 ml. of aqueous 3.5M nitric acid solution was heated to about 90° F. for about 2 minutes. There was added to the heated slurry 50 ml. of an aqueous 0.05M potassium permanganate solution and the resulting mixture was reacted for a three minute period at about 110° F. The reaction product was filtered through a Buchner funnel, water washed and then dried at about 175° F. for approximately 60 minutes,

Example 4

A slurry of 10 grams of corn starch in 100 ml. of an aqueous 1.75M nitric acid solution was prepared. There was added to the slurry 100 ml. of an aqueous 0.05M potassium permanganate solution and the resultant mixture was reacted for about 30 to 40 minutes. The resulting reaction product was filtered, water washed and air dried.

Example 5

10 grams of Argo starch and 50 ml. of an aqueous 2.0M sulfuric acid solution were slurried together at 85° F. for 1 minute. There was added to the slurry 50 ml. of an aqueous .05M potassium permanganate solution and the resultant mixture was heated to 120° F. and maintained at this temperature for 7 minutes. The resultant reaction product was filtered and the filtered, unwashed product was oven dried at 176° F.

Example 6

Preoxidized corn starch (Stayco A) in an amount of 10 grams was slurried with 50 ml. of an aqueous 2M nitric acid at a temperature at 95° F. for 2 minutes. There was added to the heated slurry 50 ml. of .1 to .05M potassium permanganate and heating continued for 2-4 minutes at 120° F. The resulting product was filtered, washed and dried.

Example 7

Preoxidized corn starch in an amount of 10 grams was slurried with 50 ml. of an aqueous 4M acetic acid solution at 120° F. for 2 minutes. There was added to the heated slurry 50 ml. of an aqueous 0.05M potassium permanganate solution and the temperature of the mixture was raised to 120° F. and maintained thereat for 6 to 8 minutes. The resultant treated product was filtered, washed and dried.

Example 8

A reaction mixture of 10 grams of Argo brand corn starch, 5 ml. of 1M sulfuric acid and 50 ml. of 3% hydrogen peroxide was reacted at 75° F. for a 5 minute period. The crude reaction product was filtered and dried for 30 minutes at a temperature of 175° F.

Example 9

A reaction mixture of 10 grams of Argo starch, 5 ml. of 2M sulfuric acid was heated for 3 minutes at 95° F. There was then added 50 ml. of 5% hypochlorous acid and resultant mixture was heated to 105° F. and maintained thereat for three minutes. The reaction product was filtered, water washed and air dried.

Example 10

A reaction mixture containing 10 grams of Argo starch, 50 ml. of 0.5M nitric acid and 50 ml. of 0.5M peroxodisulfuric acid was reacted for five minutes at room temperature (75° F.). The reaction product was then dried at 170° F.

Example 11

Following the procedure of Example 1 above, an oxidized starch dispersant was prepared in a similar manner employing the same quantities of reactants except that potato starch was used in place of corn starch.

Example 12

A reaction mixture of 20 grams of Argo starch and 50 ml. of 0.5M hydrochloric acid was prepared with stirring and heating to 120° F. There was added thereto 20 ml of 0.25M sodium dichromate solution and the resultant mixture was reacted for 50 minutes at 145° F. The reaction product was dried at 320° F. in the manner described above in Example 1.

Example 13

An admixture of 190 parts by weight of water and 6 parts by weight of nitric acid (as 100%) was heated to 120° F. with stirring. Powdered corn starch, Buffalo Starch 3401 of Corn Products Co., was added to the heated mixture in an amount of 100 parts by weight. There was then added to the mixture 3.4 parts by weight of sodium dichromate (as 100%) in combination with 65 parts by weight of water. The total amount of water present in the mixture was 255 parts by weight. The resulting mixture was heated to a temperature of 150 F. and maintained thereat for approximately 30 minutes. At the conclusion of the reaction period, the reaction product was removed from the vessel and dried on a laboratory steam-heated tray drier maintained at a temperature of 360° F. The drying rate was 0.80 pound of reaction product per hour per square foot of drying roller surface. In all 20 passes were made with the roller. The application time was 20 seconds and the total drying time was 90 seconds.

Example 14

Following the procedure described in Example 13 above, anchor experiment was carried out employing pearl grade corn starch from A. E. Staley Co. Reaction conditions, reaction times and drying cycle were the same as that described in Example 13. The total amount of water added amounted to 127.5 parts by weight of which 95 parts by weight were added with the nitric acid reactant and 32.5 parts by weight were added with the sodium dichromate reactant. The drying rate in this example was 0.44 part by weight of product per hour per square foot of drying surface.

Example 15

The procedure of Example 1 above was repeated using the same materials, reaction temperatures and drying conditions except that prior to the drying step the slurry was partially neutralized to a pH of 5 to 6 by the addition of caustic soda thereto which was used in an amount of 11 parts of aqueous caustic of 1.0M strength per 100 parts of slurry. Thereafter, the drying operation was carried out in the manner described in Example 1 above.

Example 16

Pearl grade corn starch in a weight ratio of 0.06 part of nitric acid (as 100%), 0.034 part of sodium dichromate solid (as 100%) and 1.27 parts of water per 1.00 part of starch were reacted together. The water and starch components were intimately mixed in a glass vessel equipped with a mechanical stirring device at room temperature and thereafter heated to a temperature of 120° F. over a 30 minute heating period. When the starch-water mixture had attained the 120° F. temperature, there was added thereto the nitric acid reactant employing commercial nitric acid of 42° Baumé strength over a 12 minute period. The sodium dichromate dihydrate in solid form was added to this mixture while maintaining the temperature of the mixture at 120° F. with continued stirring. The resulting mixture was heated to a temperature of 150° F. and maintained at this temperature for 30 minutes. The resulting reaction product was dried in the manner described in Example 13 above.

Example 17

Following the procedure of Example 16 above, an oxidized starch dispersant was prepared in a similar manner. In this example, however, the starch reactant was added over a 120 minute period to the water component which was maintained at a temperature of 120° F. with stirring.

Example 18

A reaction mixture was prepared in accordance with the procedure of Example 16 above as modified as shown in Example 17 above.

At the end of the 60 minute cooling period following the reaction a crude reaction product was separated, dried in a conventional drying apparatus of the cyclone type equipped with a gas fired air heater. The spray dried was operated under the following conditions: atomizing nozzle 0.090 inch diameter orifice, 3200 p.s.i.g. atomizing pressure, product feed rate 325–360 gallons per hour (g.p.h.), hot air rate 21,000 standard cubic feet per minute (s.c.f.m.), air inlet, air outlet and drier cone temperatures 442° F., 300° F., and 365° F. respectively. The dried reaction product was obtained at the rate of about 1500 pounds per hour (p.p.h.). It was a free flowing grey to olive-green powder having a moisture content of 0% by weight.

Example 19

The procedure of Example 18 above was repeated with the following changes in the spray drying step: Two cyclone drying chambers were used, the air inlet, air outlet and drier cone temperatures were 459° F., 310° F. and 350° F., respectively. The product temperature from the drier was 133° F. The product feed rate to the drier was 370 g.p.h., the air rate 17,400 s.c.f.m. and the oxidized starch dispersant product amounted to 1200 p.p.h.

Example 20

An oxidized starch dispersant was prepared from a reaction mixture containing the following components expressed in weight ratios, 6.35 parts Argo brand food grade starch, 0.569 part of 42° Baumé nitric acid, 0.429 part of 50° Baumé sodium dichromate and 7.698 parts of water. The water was heated to and maintained at a temperature of 113–119° F. while the starch component was added thereto over a 113 minute period. The nitric acid component was added to this heated mixture over a 15 minutes period, followed by the dichromate component which was added over a 12 minute period. The resulting reaction mixture was gradually heated to and maintained at a temperature of 150° F. during a 55 minute period. The crude reaction product was then cooled over a 49 minute period from 150° F. to 124° F. and further cooled to 110° F. thereafter. The resultant cooled reaction product was introduced into a cyclone spray drier having an atomizing nozzle orifice of 0.75 inch in diameter. The reaction product was spray dried under the following conditions: atomization pressure 4000 p.s.i.g., product feed rate 3.019 p.p.h., air rate 20.5 s.c.f.m., air inlet, air outlet and drier cone temperatures of 430° F., 310° F., and 340° F., respectively. There was obtained the oxidized starch product at the rate of 1.308 p.p.h.

The drilling fluids employed in the following tables were prepared in the following manner.

A top hole base mud obtained from a commercial well in the West Cote Blanche Bay area having the following properties was used as the initial mud in all cases: $V_{600}$ 70, $V_{300}$ 55, PV 15, YP 40, AV 35, Gels at 0 and 10 min., 14 and 40 respectively, pH 8.7, API water loss (30 min.) 11.0.

The low pH mud was prepared from the above described base mud in which the dispersant was incorporated in the desired amount. The mud was rolled overnight and then sodium hydroxide was added in an amount sufficient to provide a pH of about 9.5 for the mud system.

The low lime mud composition was: 3 lbs. per barrel of lime, 3 lbs. per barrel of thinner (dispersant), 1 lb. per barrel of sodium hydroxide. The mud was prepared by adding 2 lbs. of the thinner and 1 lb. of sodium hydroxide, per barrel of the base mud, the mixture aged for 4 hours, and an additional 1 lb. of thinner and 3 lbs. of lime per barrel of mud were added. The mud was further aged by rolling overnight.

The high lime mud was prepared using 6 lbs. of lime, 3 lbs. of thinner and 1 lb. of sodium hydroxide, per barrel of base mud. The mud was broken over in the following manner: 2 lbs. of thinner and 1 lb. of sodium hydroxide, per barrel of mud were first added, the mud was aged for four hours and then 1 lb. of thinner and 6 lbs. of lime per barrel were added thereto.

The shale control mud was prepared using 3.5 lbs. of thinner, 3.0 lbs. of lime and 0.8 lb. of calcium chloride, per barrel of mud. The gyp mud was prepared using 5 lbs. of gypsum, 5 lbs. of thinner and from 0.5 to 1 lb. of caustic to yield a final pH in the range of 9.5 to 10, per barrel of mud.

In the tables, gel strength (Gels) is reported as determined by a shearometer in accordance with the procedure in the American Petroleum Institute publication RP–29, results being expressed either as pounds/100 square feet or as time in seconds for a tube to settle in the mud (after the mud has stood for zero time and for 10 minutes). If it settles in more than 60 seconds, shear is reported as pounds per hundred square feet. Plastic Viscosity (PV) is calculated by subtracting the Fann Viscosity at 300 r.p.m. from the Fann Viscosity at 600 r.p.m. Yield Point (YP) is obtained by calculation, subtracting the Plastic Viscosity (PV) from the Fann Viscosity at 300 r.p.m. Apparent Viscosity (AV) is equal to one half of the Fann Viscosity obtained at 600 r.p.m. The fluidity of a mud can be back calculated from these data, the results being expressed in Fann Viscosities at 600 r.p.m. and 300 r.p.m. for a direct reading viscosimeter.

The data in the following Table A show representative characteristics of a variety of drilling fluid systems containing the oxidized starch dispersants of the invention prepared from different reactant components.

TABLE A

| Example | Mud Type | Thinner, lbs./bbl. | PV (cpe.) | YP, #/100 ft.$^2$ | AV (cpe.) | Gel Strength 0 | Gel Strength 10 | Water Loss (30'), ml. | Shear Value* |
|---|---|---|---|---|---|---|---|---|---|
| 1 | SC | 3.5 | 27 | 0 | 25 | $0^1$ | $0^{12}$ | 23.2 | 450 |
|   | LpH | 7 | 11 | 1 | 11.5 | $0^1$ | $0^1$ | 10.0 |  |
|   | LL | 3 | 27 | 1 | 27.5 | $0^1$ | $0^9$ | 14 |  |
|   | HL | 3 | 26 | 0 | 25.5 | $0^1$ | $0^{11}$ | 15.2 | 300 |
| 2 | SC | 3.5 | 38 | 0 | 36 | $0^1$ | $0^2$ | 26.0 | 250 |
|   | LpH | 7 | 19 | 3 | 20.5 | $0^1$ | $0^5$ | 9.2 |  |
|   | LL | 3 | 29 | 1 | 29.5 | $0^1$ | $0^5$ | 14.4 | 320 |
|   | HL | 3 | 22 | 2 | 23 | $0^1$ | $0^1$ | 14.0 |  |
| 5 | SC | 3.5 | 20 |  | 39 | 4.5 | 5 |  |  |
|   | LpH | 7 | 34 | 10 | 33 | 0 | $0^{31}$ | 7.6 | 230 |
| 7 | LpH | 8 | 21 |  | 31 | $0^2$ | 12 | 8.0 |  |
| 8 | SC | 3.5 | 29 | 7 | 32.5 | $0^1$ | $0^{36}$ |  |  |
|   | LpH | 8 | 26 | 4 |  | $0^1$ | $0^1$ |  |  |
| 12 | SC | 3.5 | 18 | 5 | 20.5 | $0^1$ | $0^{12}$ | 47 |  |
|   | LpH | 7 | 11 | 1 | 11.5 | $0^1$ | $0^1$ | 9.2 |  |
| 14 | SC | 3.5 | 24 | 2 | 25 | $0^1$ | $0^{12}$ | 42.0 | 430 |
|   | LpH | 7 | 14 | 2 | 15 | $0^1$ | $0^1$ | 9.6 |  |
| 16 | SC | 3.5 | 24 | 0 | 22 | $0^1$ | $0^7$ | 36.2 | 400 |
|   | LpH | 7 | 10 | 0 | 10 | $0^1$ | $0^1$ | 11.6 |  |

*Shear Value=#/100 ft.$^2$ after bombing 24 hrs. at 350° F.
SC=Shale Control Mud. LpH=Low pH Mud. LL=Low Lime Mud. HL=High Lime Mud.

TABLE B.—INFRARED ABSORBANCE

| Example | OH (2.95μ) | C=O (5.8μ) | C=O (6.0–6.3μ) |
|---|---|---|---|
| 1 | *.682 | 0 | .130 (6.12) |
| 2 | .728 | .132 | |
| 3 | .677 | .055 | |
| 4 | .551 | .048 | |
| 5 | 1.00 | .125 | |
| 8 | .690 | .056 | |
| 13 | .662 | 0 | .130 (6.08) |
| 14 | .783 | 0 | .161 (6.08) |
| 15 | .500 | 0 | .084 (6.08) |
| 18 | .834 | 0 | |
| Argo Food Grade | *.335 | .046 | .091 (6.07) |
| Preoxidized starch Stayco A | .293 | .056 | .093 (6.07) |

*At 2.96μ.

Table B above shows representative infrared absorbance values of some of the oxidized starch dispersants of the present invention.

Table C below gives various properties of muds containing the oxidized starch dispersant of the present invention and also comparative results for a variety of commercial dispersants used in drilling operations.

stabilization and hardening of shaley underground formations in contact therewith during drilling operations. The term "Pf" represents the number of cc. of 0.02 N sulfuric acid required to titrate 1 cc. of aqueous phase (filtrate) of drilling fluid to phenolphthalein end point and measures the soluble hydroxyl ion content of the filtrate. The term "Pm" represents the number of cc. of 0.02 N sulfuric acid required to titrate 1 cc. of whole mud and measures the rapidly available hydroxide alkalinity of the whole mud.

The base mud employed in these tests was a West Cote Blanche Bay hole mud having a solids content of about 13% by weight and a salt content of less than 500 p.p.m.

TABLE D

| Additives | PV, cpe. | YP, cpe. | AV, cpe. | Gel Strength, lb./100 ft.$^2$ 0' | 10' | pH | Pm, cc. | Pf, c.c | Ca, p.p.m. | API Water Loss (30'), ml. |
|---|---|---|---|---|---|---|---|---|---|---|
| Base Mud | 9 | 21 | 19.5 | | | 8.3 | | | | |
| Plus 2.5# starch* plus 2.5# lime | 21 | −9 | 16.5 | 0$^1$ | 0$^1$s | 12.1 | 7.8 | 1.7 | 296 | 32.8 |
| Plus 4# starch* plus 3# lime | 28 | −9 | 23.5 | 0$^1$ | 0$^2$ | 12.2 | 9.2 | 1.9 | 480 | 27.0 |
| Plus 5# starch* plus 3# lime | 29 | −6 | 26 | 0$^1$ | 0$^1$ | 12.1 | 8.5 | 1.9 | 560 | 25.2 |

*Dichromate oxidized in nitric acid starch dispersant.

Drilling fluids containing the novel oxidized starch dispersants of the invention are resistant to contamination by the materials normally encountered in drilling operations, such as salt, clay and gypsum. The resistance of drilling fluids to clay contamination is outstanding when the dispersant is the novel oxidized starch dispersant of this invention.

TABLE C

| Dispersant | Amount, lbs./bbl. | Type Mud | PV | YP | AV | Gel Strength 0$^1$ | 10$^1$ | Water Loss (30'), ml. | Shear Value* |
|---|---|---|---|---|---|---|---|---|---|
| Example 1 | 2 | LpH | 18 | 4 | 20 | 0$^1$ | 0$^{30}$ | 11.6 | |
| | 4 | LpH | 14 | 3 | 15.5 | 0$^1$ | 0$^2$ | 8.8 | |
| | 12 | LpH | 12 | 2 | 13 | 0$^1$ | 0$^1$ | 8.8 | |
| Q-Broxin | 2 | LpH | 16 | 2 | 17 | 0$^1$ | 0$^2$ | 9.6 | |
| | 4 | LpH | 15 | 1 | 15.5 | 0$^1$ | 0$^1$ | 8.4 | |
| | 12 | LpH | 16 | 0 | 15 | 0$^1$ | 0$^1$ | 8.2 | |
| Example 2 | 3 | LL | 29 | 0 | 27.5 | 0$^1$ | 0$^5$ | 15.4 | |
| Quebracho | 3 | LL | 29 | 6 | 32 | 0$^1$ | 5.0 | 14 | |
| Q-Broxin | 3 | LL | 21 | 9 | 25.5 | 0$^2$ | 4.5 | 14 | |
| Rayflo | 3 | LL | 45 | 19 | 35.5 | 12.5 | 15 | 15.2 | |
| Example 3 | 3.5 | SC | 15 | 8 | 19 | 0$^2$ | 0$^{11}$ | 80.4 | 240 |
| Example 4 | 3.5 | SC | 21 | 0 | 16.5 | 0$^1$ | 0$^2$ | 75.8 | 230 |
| Kembreak | 3.5 | SC | 31 | 18 | 40 | 7.2 | 8.0 | 30 | 1,250 |
| Q-Broxin | 3.5 | SC | 32 | 7 | 35.5 | 4.3 | 6.0 | 27.6 | 600 |
| Example 3 | 7 | GYP | 12 | 0 | 11.5 | 0$^1$ | 0$^{1.5}$ | 31.6 | |
| Q-Broxin | 7 | GYP | 22 | 1 | 22.5 | 0$^1$ | 0$^2$ | 13.6 | |

*#/100 ft.$^2$ after bombing 8 hrs. at 300° F.
LpH=Low pH mud. LL=Low Lime mud. SC=Shale Control mud. GYP=Gyp mud.

Inspection of the data in the above Table C shows that the oxidized starch dispersants of the present invention are at least equal to the ferrochrome lignosulfonate dispersant sold under the trade name Q-Broxin, in a low pH mud system, and superior to it in the low lime, shale control and gyp mud systems. The data further show that the novel oxidized starch dispersants are superior in low lime and shale control muds to other commercial dispersants sold under the trade names Kembreak, a calcium lignosulfonate dispersant or thinner of Rayflo, a predominantly sodium salt of a polymeric polyphenol derivative, apparently obtained as an extract from hemlock bark. Similar beneficial results are found in other mud systems containing the oxidized starch dispersants.

The following Table D illustrates a particular novel feature of the present invention wherein an aqueous drilling fluid containing only lime and the novel oxidized starch dispersant is able to attain relatively low Yield Point and Apparent Viscosity values and also low gel values. In addition, it is to be noted that the Pf and Pm values in the table are approximately the same values as obtainable in the shale control drilling fluid of Weiss and Hall, U.S. 2,802,783 which requires the presence therewith of a water soluble calcium salt to provide a calcium ion concentration of more than 200 p.p.m. to effect The novel oxidized starch dispersants of this invention can also be used successfully in drilling fluids containing supplementary drilling fluid additives such as clay, weighting agents, water loss additives and the like.

It has been found that the addition of a minor amount of water soluble metal salt such as sodium chromate to the drilling fluid containing the oxidized starch dispersant of the invention also imparts beneficial effects to the mud system.

Obviously, many modifications and variations of the invention, as hereinbefore set forth, may be made without departing from the spirit and scope thereof, and therefore only such limitations should be imposed as are indicated in the appended claims.

1. A method of producing a chemically oxidized starch dispersant for use in an aqueous drilling fluid to disperse clay solids therein and to improve the high temperature stability of said drilling fluid which comprises reacting a starch material with a water and acid soluble inorganic oxidizing agent selected from the group consisting of permanganates, chromates, dichromates, chlorates, chlorites, hypochlorites, bromates, hypobromites, peroxides, peroxodisulfates, hypochlorous acid and peroxodisulfuric acid which is present in an amount of from about 0.04 to about 0.5 gram atom of available oxygen per 100 grams of starch reactant in an aqueous acidic reaction medium selected from the group consisting of the mineral inorganic acids, acetic acid, propionic acid, benzenesulfonic acid and toluenesulfonic acid wherein the acid reactant is present in an amount of from about 4.5 to about 220% by weight per part by weight of starch at a temperature in the range of from about 75° F. to about 150° F. and below the gel temperature of the starch material in the reaction medium for a period of time between about 2 minutes and about 75 minutes and sufficient to form an oxidized starch dispersant and drying the resulting oxidized starch product.

2. A method as claimed in claim 1 wherein said oxidizing agent is sodium dichromate.

3. A method as claimed in claim 1 wherein said oxidizing agent is potassium permanganate.

4. A method as claimed in claim 1 wherein said oxidizing agent is hydrogen peroxide.

5. A method as claimed in claim 1 wherein said oxidizing agent is hypochlorous acid.

6. A method as claimed in claim 1 wherein said acidic reaction medium is acetic acid.

7. A method as claimed in claim 1 wherein said acidic reaction medium is nitric acid.

8. A method as claimed in claim 1 wherein said acidic reaction medium is hydrochloric acid.

9. A method as claimed in claim 1 wherein said acidic reaction medium is sulfuric acid.

10. A method as claimed in claim 1 wherein the reaction temperature is between about 130 and 150° F.

11. A method as claimed in claim 1 wherein the reaction is carried out for a period between about 30 and 60 minutes.

12. A method as claimed in claim 1 wherein the oxidized starch dispersant is dried at a temperature in the range of from about 125 to about 450° F.

13. A method as claimed in claim 1 wherein the oxidized starch dispersant is dried at a temperature between about 300 and 375° F.

14. A method as claimed in claim 1 wherein the oxidized starch dispersant is recovered from the reaction product by filtration and dried at a temperature between about 150 and 250° F.

15. A method as claimed in claim 1 wherein drying is carried out for a period of about 5 to 15 minutes.

16. A method as claimed in claim 1 wherein the inorganic oxidizing agent is present in the reaction mixture in the range of from about 0.04 to 0.11 gram atom of available oxygen per 100 grams of starch.

17. A method as claimed in claim 1 wherein the oxidized starch dispersant is dried to a water content of from about 5 to 8% by weight.

18. A method as claimed in claim 1 wherein the oxidized starch dispersant is neutralized with an alkaline reagent to a pH in the range of from about 4 to 7 before drying.

19. A method as claimed in claim 18 wherein the the neutralized oxidized starch dispersant is dried to a water content of from about 3 to 6% by weight.

20. A chemically oxidized starch dispersant produced by reacting food-grade corn starch with sodium dichromate which is present in an amount in the range of from about 0.04 to about 0.11 gram atom of available oxygen per 100 grams of starch reactant in an aqueous nitric acid solution containing from about 4.5 to about 44% by weight of nitric acid per part of starch reactant at a temperature between about 130 and 150° F. for 50 to 60 minutes to form an oxidized reaction product and wherein the formed reaction product is spray dried at a temperature between about 300–350° F. for 5 minutes to a water content of less than of about 10% by weight.

No references cited.

DONALD E. CZAJA, Primary Examiner

M. I. MARQUIS, Assistant Examiner

U.S. Cl. X.R.

127—33, 71; 252—8.5